United States Patent Office.

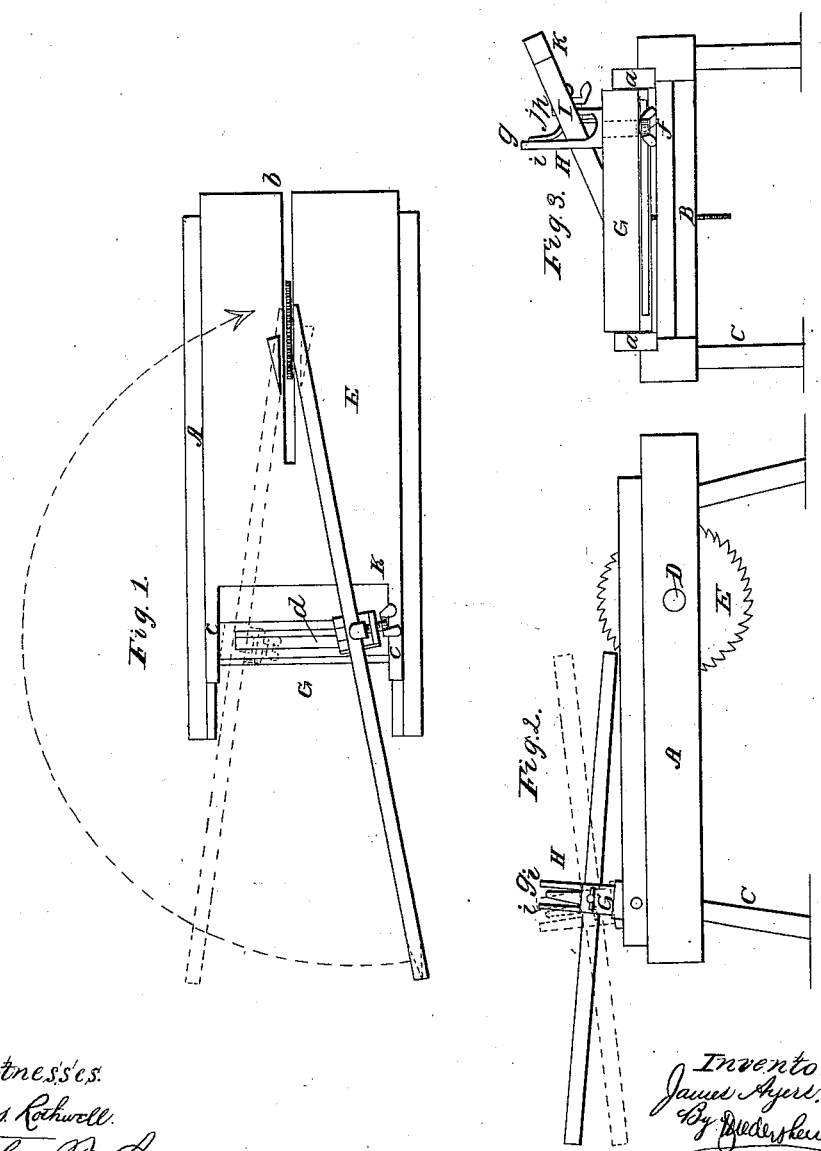

JAMES AYRES, OF BRANCHVILLE, NEW JERSEY.

Letters Patent No. 85,265, dated December 29, 1868.

IMPROVEMENT IN DEVICE FOR SHARPENING RAILS

The Schedule referred to in these Letters Patent and making part of the same.

*To all whom it may concern:*

Be it known that I, JAMES AYRES, of Branchville, in the county of Sussex, and State of New Jersey, have invented a new useful Improvement in Sharpening Rails for Post-Fences; and I do hereby declare the following to be a full, clear, and exact description thereof, sufficient to enable those skilled in the art to which my invention appertains, to fully understand the same, reference being had to the accompanying drawings, forming part of this specification, and in which—

Figure 1 is a top view of my machine;

Figure 2, a side elevation; and

Figure 3, an end elevation of the same.

Rails for post-fences are usually sharpened at the ends by chopping with a hatchet or axe. This is a troublesome and slow operation, and one which requires great care to sharpen both ends and sides equally, so as to bring the extremities in the centre of the rail, and in a straight line with each other. Unless the rails are equally sharpened at both ends, a neat and substantial fence cannot be produced.

The object of my present invention is to provide means whereby the rails are equally and expeditiously sharpened; and The invention consists in adjustably fitting a swivelled clamp in a transverse rock-bar, which has its bearings in a slotted sliding bed, all constructed and arranged substantially as hereinafter described.

In order to enable others to understand my invention, so as to make and use the same, I will now proceed to describe it in detail, referring to the drawing, whereon similar letters, in the several figures, indicate like parts.

A A, in the drawings, indicate the side pieces of the framing of my machine, and B B, the cross-pieces of the same, all supported on legs C.

D represents a transverse shaft, journalled in bearings in the side-pieces A A.

On this shaft a circular saw, E, is keyed. The saw may be driven by steam or animal-power, or otherwise, as may be desired.

F is the bed of the machine, fitted to slide on ways $a\ a$, formed in the side-pieces A A. The saw E projects above the surface of the platform, which is slotted longitudinally at $b$ for its passage.

$c\ c$ are side extensions at one end of the bed F.

In these extensions are formed bearings for the journals of a transverse rock-bar, G, which is provided with a longitudinal slot, $d$.

H represents a block, formed with a shank. $e$, which extends through the slot $d$.

The lower end of this shank is formed with a screw-thread on which the thumb-nut $f$ is fitted.

The block H is cut out into a U-shape, forming long and short sides, $g\ h$, respectively.

The side $g$ is divided vertically, forming arms $i\ i$, fig. 2.

$j$ is a curved tongue of metal, hinged at its lower end within the block H, and roughened on its inner face, so as to bite the rail I, which is clamped between the tongue $j$ and the side $g$ of block H, by means of the set-screw $k$, working through the side $h$ of block H, and pressing against the tongue.

The operation is as follows, viz:

The carriage or bed F having been drawn back, the rail is centrally clamped between the side $g$ and tongue $j$, or in any other suitable manner.

The block H is now moved to one side, as shown in black lines, fig. 1, and the nut $f$ screwed up against the under side of bar G.

The carriage F is next run forward, so that the rail comes in contact with the saw. E, which, being driven at high speed, cuts off, from one side of the rail, an angular block, as shown in fig. 1.

The carriage is now run back, the nut $f$ loosened slightly, and the block H moved to the position shown in red, fig. 1, where it is clamped as before. The other side of the rail is now sharpened, as above described, and as represented in red.

The carriage is again run back, the rail swung round, as indicated by the red arrow, fig. 1, and its end 2 sharpened as before; or, if deemed preferable, the rail, after having been cut on one end at one side, may be swung around, as indicated by the red arrow, and one side of the opposite end cut off. The block H is now moved to the position shown in red, and by reversing the rail once, the sharpening is completed.

It may be found better to move the carriage forward, so that the end of the rail shall pass the saw, then drawing back the carriage, so that the saw commences its cut on the side of the rail, and cuts through to the end.

The advantages of my invention will be obvious to all who have occasion to employ this class of machinery. Its prominent recommendations are, extreme simplicity, cheapness, and effective, satisfactory operation.

I do not claim broadly a device for sharpening rails, in which the rail is fixed in an adjustable swivelled clamp, so arranged that the rail may be sharpened at both extremities by a power-saw, without removing the rail from the clamp, as I am aware that this is not new; but

What I claim as new, and of my invention, in this machine, is—

The swivelled holding and clamping-block H, and the rock-shaft G, arranged and operating as described.

JAMES AYRES

Witnesses:
LUTHER C. BOWLBY,
ROBERT L. GARRISON.